(12) United States Patent
Yamazaki et al.

(10) Patent No.: US 11,059,322 B2
(45) Date of Patent: Jul. 13, 2021

(54) WHEEL FOR RAILWAY VEHICLE

(71) Applicants: NIPPON STEEL CORPORATION, Tokyo (JP); UNIVERSITY OF IOWA RESEARCH FOUNDATION, Iowa City, IA (US)

(72) Inventors: Yohsuke Yamazaki, Tokyo (JP); Osamu Kondo, Tokyo (JP); Takanori Kato, Tokyo (JP); Takahiro Fujimoto, Tokyo (JP); Hiroyuki Sugiyama, Iowa City, IA (US); Christofer Feldmeier, Iowa City, IA (US)

(73) Assignees: NIPPON STEEL CORPORATION, Tokyo (JP); UNIVERSITY OF IOWA RESEARCH FOUNDATION, Iowa City, IA (US)

( * ) Notice: Subject to any disclaimer, the term of this patent is extended or adjusted under 35 U.S.C. 154(b) by 11 days.

(21) Appl. No.: 16/110,679

(22) Filed: Aug. 23, 2018

(65) Prior Publication Data
US 2020/0062030 A1    Feb. 27, 2020

(51) Int. Cl.
    *B60B 17/00*    (2006.01)
(52) U.S. Cl.
    CPC .......... *B60B 17/00* (2013.01); *B60B 17/0068* (2013.01)
(58) Field of Classification Search
    CPC ..... B60B 19/02; B60B 17/0055; B60B 17/00; B60B 17/0068; B60B 17/0065; B60B 17/0062
    See application file for complete search history.

(56) References Cited

U.S. PATENT DOCUMENTS

| | | | | |
|---|---|---|---|---|
| 3,107,115 A | * | 10/1963 | Kastner | B60B 17/0017 295/31.1 |
| 4,026,217 A | | 5/1977 | Cross et al. | |
| 5,549,343 A | * | 8/1996 | Blazer | B60B 17/00 295/31.1 |
| 5,910,343 A | * | 6/1999 | Olofsson | B60B 17/00 427/597 |
| 2005/0104398 A1 | * | 5/2005 | Nast | B60B 17/0068 295/34 |

FOREIGN PATENT DOCUMENTS

| | | |
|---|---|---|
| DE | 10346020 A1 | 4/2005 |
| EP | 800933 A2 | 10/1997 |
| JP | 05278404 A | 10/1993 |
| WO | WO-9008047 A1 * 7/1990 | ......... B60B 17/0055 |
| WO | WO-0005118 A1 * 2/2000 | ............... B61F 9/00 |

OTHER PUBLICATIONS

ISR issued in Int'l. App. No. PCT/US2019/046880, dated Nov. 18, 2019.

* cited by examiner

*Primary Examiner* — Scott A Browne
(74) *Attorney, Agent, or Firm* — Greer Burns & Crain Ltd.

(57) ABSTRACT

The wheel is for a railway vehicle that travels on a rail. The wheel includes a wheel tread, a flange and a throat portion. The wheel tread is provided at an outer circumferential portion of the wheel. The wheel tread faces a head surface of the rail. The flange is provided at the outer circumferential portion of the wheel. The flange projects further outward than the wheel tread in the radial direction of the wheel. The throat portion connects the surface of the flange and the wheel tread. The throat portion has a protrusion. The protrusion projects to the rail side. The protrusion extends along the entire circumference of the throat portion.

2 Claims, 7 Drawing Sheets

WHEEL FOR RAILWAY VEHICLE

TECHNICAL FIELD

The present disclosure relates to a wheel for a railway vehicle that travels on a rail.

BACKGROUND ART

In general, a wheel for a railway vehicle includes a boss portion, a rim portion and a web portion. An axle is inserted into the boss portion. The rim portion constitutes an outer circumferential portion of the wheel. The web portion connects the boss portion and the rim portion.

The rim portion includes a wheel tread, a flange and a throat portion. The wheel tread contacts the head surface of the rail when the railway vehicle is travelling. The flange projects further outward than the wheel tread in the radial direction of the wheel. The throat portion is a curved face that connects the wheel tread and the surface of the flange.

Patent Literature 1 discloses a wheel in which the structure of a rim portion is a feature. According to Patent Literature 1, a conventional wheel normally contacts a rail at a single point. However, in a case where a railway vehicle travels around a sharp curve, or in a case where wear of the rail has progressed, the conventional wheel contacts the rail at two points. At such time, slippage occurs at the wheel, the amount of which is calculated by the distance between the contact points in the vertical direction×2×the circular constant. Therefore, Patent Literature 1 proposes a structure in which a concave groove is provided in the throat portion. At a wheel on the outer rail side, the two edges of the groove are contact points A and B with the rail. The contact point A is a contact point of the wheel with respect to the corner portion of the rail, and is located in the vicinity of the base of the flange. The contact point B is a contact point of the wheel with respect to the head surface of the rail, and is located in the vicinity of the wheel tread. By this means, a distance in the vertical direction between the contact points A and B decreases and slippage is reduced.

CITATION LIST

Patent Literature

Patent Literature 1: Japanese Patent Application Publication No. 05-278404

SUMMARY OF INVENTION

Technical Problem

When a railway vehicle is passing a sharp curve, the flange bears a horizontal force (lateral force) received by the wheel from the rail. Consequently, even when the distance in the vertical direction between the two contact points of the flange and the wheel tread at the wheel on the outer rail side decreases, slippage on the flange due to a radius difference between wheels on the inner and outer rail sides cannot be reduced. A fore-aft tangential force (longitudinal creep force) generated at the flange contributes to wear progression on the flange. To reduce wear on the flange, it is important to lower the longitudinal creep force and the contact interfacial pressure.

However, in the case of the wheel disclosed in Patent Literature 1, an effect of lowering the longitudinal creep force and the contact interfacial pressure cannot be achieved. More specifically, the wheel disclosed in Patent Literature 1 contacts the rail at the contact point B in addition to the contact point A. Because the contact point B is located in the vicinity of the wheel tread, the contact point B cannot bear a lateral force that acts on the wheel. Hence, in the case of the wheel disclosed in Patent Literature 1, the lateral force is borne only by the contact point A that is located in the vicinity of the base of the flange. Consequently, the contact interfacial pressure, and therefore the longitudinal creep force, increases, and the base of the flange is subjected to wear.

An objective of the present disclosure is to reduce wear of a wheel for a railway vehicle.

Solution to Problem

A wheel according to the present disclosure is a wheel for a railway vehicle that travels on a rail. The wheel includes a wheel tread, a flange and a throat portion. The wheel tread is provided at an outer circumferential portion of the wheel. The wheel tread faces a head surface of the rail. The flange is provided at the outer circumferential portion of the wheel. The flange projects further outward than the wheel tread in a radial direction of the wheel. The throat portion connects a surface of the flange and the wheel tread. The throat portion has a protrusion. The protrusion projects to the rail side. The protrusion extends along an entire circumference of the throat portion.

Advantageous Effects of Invention

According to the present disclosure, wear of a wheel for a railway vehicle can be reduced.

DESCRIPTION OF EMBODIMENTS

Figure 1:
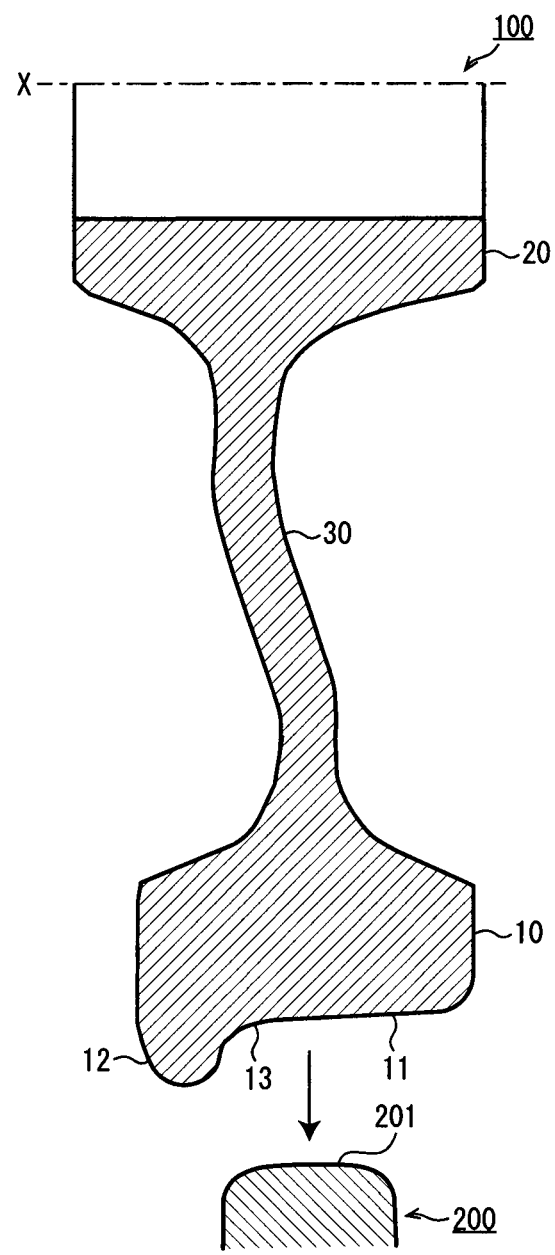
FIG. 1 is a longitudinal sectional view illustrating a wheel according to an embodiment, and a head part of a rail.

A wheel according to an embodiment is a wheel for a railway vehicle that travels on a rail. The wheel includes a wheel tread, a flange and a throat portion. The wheel tread is provided at an outer circumferential portion of the wheel. The wheel tread faces a head surface of the rail. The flange is provided at the outer circumferential portion of the wheel. The flange projects further outward than the wheel tread in the radial direction of the wheel. The throat portion connects the surface of the flange and the wheel tread. The throat portion has a protrusion. The protrusion projects to the rail side. The protrusion extends along the entire circumference of the throat portion.

In the wheel according to the embodiment, the protrusion of the throat portion also contacts the rail in addition to the flange thereof. The protrusion of the throat portion can bear a lateral force that acts on the wheel. Hence, the lateral force is dispersed between the flange and the protrusion.

Thus, according to the wheel of the embodiment, the lateral force can be dispersed at a plurality of contact points. Hence, the contact interfacial pressure and the longitudinal creep force can be decreased and wear of the wheel can be reduced.

Preferably, the protrusion is connected by a curved face with a portion of the throat portion other than the protrusion.

By connecting the protrusion of the throat portion with a portion other than the protrusion by means of a curved face, the wheel can be caused to smoothly move on the rail. Hence, in a railway vehicle that utilizes the wheel according to the embodiment, comfortable ride quality can be secured.

Hereunder, an embodiment of the present disclosure is described while referring to the drawings. In the drawings, the same reference symbols are assigned to the same or equivalent parts, and a description thereof is not repeated.

[Structure of Wheel]

FIG. 1 is a longitudinal sectional view illustrating the schematic structure of a wheel 100 according to the embodiment and a head part of a rail 200. The term "longitudinal section" of the wheel 100 refers to a cross-section when the wheel 100 is cut along a plane that includes a rotation axis X. The term "longitudinal section" of the rail 200 refers to a cross-section when the rail 200 is cut along a vertical plane.

Referring to FIG. 1, the wheel 100 is mounted onto an unshown railway vehicle. The railway vehicle travels on the rail 200. When the railway vehicle travels on the rail 200, the wheel 100 rotates around a rotation axis X while the wheel 100 is in contact with the rail 200. Hereunder, the direction in which the rotation axis X extends is referred to as "axial direction", and the direction that is perpendicular to the axial direction is referred to as "radial direction".

The wheel 100 is formed in a substantially discoid shape. The wheel 100 includes a rim portion 10, a boss portion 20 and a web portion 30. The rim portion 10 constitutes an outer circumferential portion of the wheel 100. An axle (not illustrated) is inserted into the boss portion 20. The center of the axle is a rotation axis X. The web portion 30 connects the rim portion 10 and the boss portion 20.

The wheel 100 includes a wheel tread 11, a flange 12 and a throat portion 13. The wheel tread 11, the flange 12 and the throat portion 13 are provided at the outer circumferential portion of the wheel 100. The wheel tread 11, the flange 12 and the throat portion 13 are included in the rim portion 10. The outer diameter of the wheel 100 increases in the direction from the wheel tread 11 toward the flange 12.

The wheel tread 11 faces a head surface 201 of the rail 200. The wheel tread 11 is an approximately annular face that is centered on the rotation axis X. The diameter of the wheel tread 11 increases gradually toward the throat portion 13. The shape of the wheel tread 11 is not particularly limited. The wheel tread 11, for example, may be a conical wheel tread or an arcuate wheel tread, or may be a wheel tread of another shape. In the wheel tread 11, at least a region that is adjacent to the throat portion 13 has a substantially constant gradient.

The flange 12 is formed along the entire circumference of the wheel 100. The flange 12 projects further outward than the wheel tread 11 in the radial direction of the wheel 100. The flange 12 is disposed on the inner side of the rail 200 in the width direction of a railway track that includes the rail 200. The surface of the front end portion of the flange 12 is mainly constituted by a curved face that is outwardly convex in the radial direction of the wheel 100. In the flange 12, the surface of a region adjacent to the throat portion 13 has a substantially constant gradient. An angle that the aforementioned region forms with a face parallel to the rotation axis X is referred to as a "flange angle".

The throat portion 13 is disposed between the wheel tread 11 and the flange 12. The throat portion 13 connects the wheel tread 11 and the flange 12.

Figure 2:
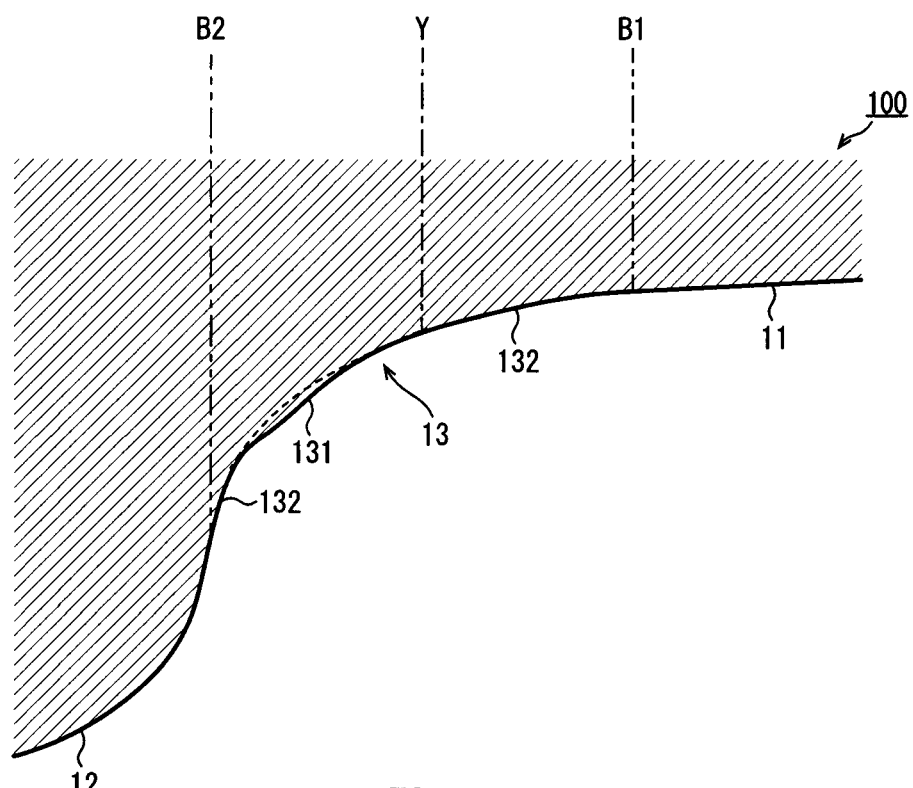
FIG. 2 is an enlarged view of a throat portion of the wheel illustrated in FIG. 1.

FIG. 2 is an enlarged view of the throat portion 13. The outer peripheral surface of the wheel 100 has changing points in the gradient at a boundary B1 between the wheel tread 11 and the throat portion 13 and at a boundary B2 between the throat portion 13 and the flange 12. The gradient of the throat portion 13 is greater than the gradient of the wheel tread 11. The gradient of the throat portion 13 is smaller than the gradient of a region of the flange 12 that is adjacent to the throat portion 13, that is, the gradient of the region constituting the flange angle.

As illustrated in FIG. 2, the throat portion 13 has a protrusion 131. In the present embodiment, one protrusion 131 is formed in the throat portion 13. However, a plurality of the protrusions 131 can also be provided in the throat portion 13.

The protrusion 131 projects to the rail 200 (FIG. 1) side. The protrusion 131 extends along the entire circumference of the throat portion 13. In other words, the protrusion 131 forms an annular shape that is centered on the rotation axis X (FIG. 1). The protrusion 131 preferably has a constant shape along the entire circumference of the throat portion 13.

The throat portion 13 is constituted by one or more kinds of curved face. The protrusion 131 and portions 132 that are adjacent to the protrusion 131 each include one or more kinds of curved face. However, the protrusion 131 curves in the opposite direction to the other portions 132. The center of curvature of the curved faces constituting the other portions 132 is located on the outer side of the relevant curved face in the radial direction of the wheel 100. The center of curvature of the curved face constituting the protrusion 131 is located on the opposite side to the center of curvature of the other portions 132 in a manner such that the contour line of the throat portion 13 is put therebetween.

In a conventional wheel, the directions of curved faces constituting the throat portion match. Conventionally, the respective centers of curvature of the curved faces in the throat portion are all located on the outer side of the wheel 100. In FIG. 2, the shape of a conventional throat portion in which the protrusion 131 does not exist is shown with a broken line.

Figure 3:
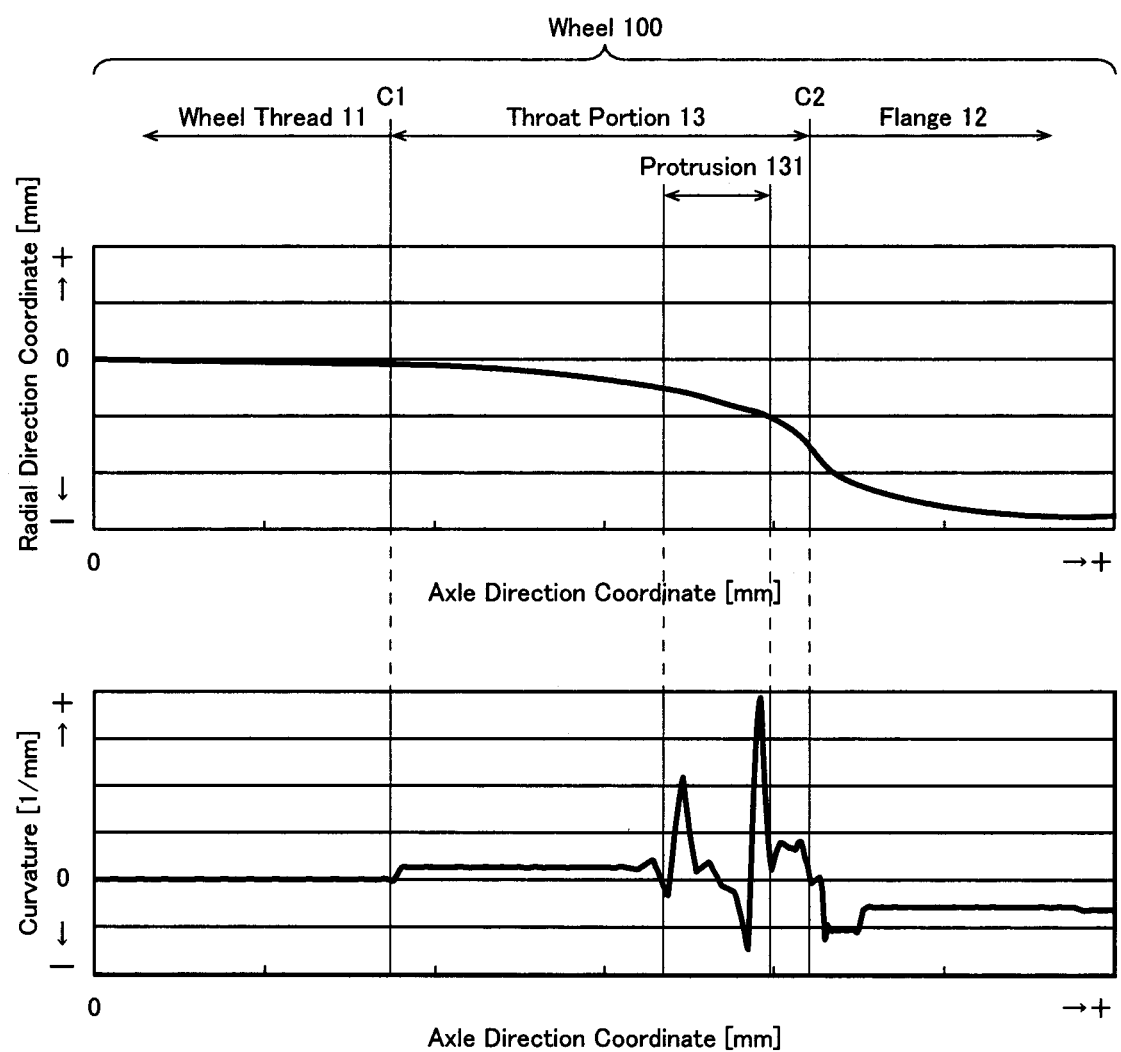
FIG. 3 shows graphs representing, with respect to a longitudinal section of the wheel illustrated in FIG. 1, a contour of the wheel and the curvature thereof, respectively.

FIG. 3 shows graphs representing, with respect to a longitudinal section of the wheel 100, the contour (external shape) of the wheel 100 and the curvature thereof, respectively. In the upper diagram in FIG. 3, in a coordinate system in which a position in the radial direction of the wheel 100 is taken as the ordinate and a position in the axle direction is taken as the abscissa, a graph is shown in which contour coordinates of the wheel 100 are plotted. The graph in question shows the flange 12 side from the center in the axle direction of the contour of the wheel 100. In the radial direction (ordinate), the axle side is taken as positive, and in the axle direction (abscissa) the flange 12 side is taken as positive. Further, in the lower diagram in FIG. 3, a graph is shown in which, with respect to the wheel 100, the curvature at each contour coordinate in the axle direction is plotted. In the graph in question, a curvature in a case where the center of curvature is on the lower side relative to the contour of the wheel shown in the upper diagram is taken as positive, and the curvature in a case where the center of curvature is on the upper side relative to the contour of the wheel shown in the upper diagram is taken as negative.

Referring to FIG. 3, in the wheel tread 11 the curvature is maintained at approximately zero. Upon entering the throat portion 13 from the wheel tread 11, the curvature changes significantly to the positive side. At the flange 12, the curvature mainly transitions with a negative value. The curvature is approximately zero at the boundary between the flange 12 and the throat portion 13, and changes to the positive side upon entering the throat portion 13.

That is, when changes in the curvature of the outer peripheral surface of the wheel 100 from the wheel tread 11 toward the throat portion 13 are viewed, it is seen that the curvature begins to change from a value of substantially zero to a positive value at a contour coordinate C1 in the axle direction. When changes in the curvature of the outer peripheral surface of the wheel 100 from the flange 12 toward the throat portion 13 are viewed, it is seen that the curvature begins to change from a value of substantially zero to a positive value at a contour coordinate C2 in the axle direction. In the outer peripheral surface of the wheel 100, a portion from the contour coordinate C1 to the contour coordinate C2 is the throat portion 13. The contour coordinate C1 corresponds to a position in the axle direction of the boundary B1 (FIG. 2) between the wheel tread 11 and the throat portion 13. The contour coordinate C2 corresponds to a position in the axle direction of the boundary B2 (FIG. 2) between the throat portion 13 and the flange 12.

As illustrated in FIG. 3, in the throat portion 13, the curvature is maintained at a positive value except for the protrusion 131. The protrusion 131 has a negative curvature. The curvature of the throat portion 13 temporarily changes from a positive value to a negative value at the protrusion 131.

Figure 4:
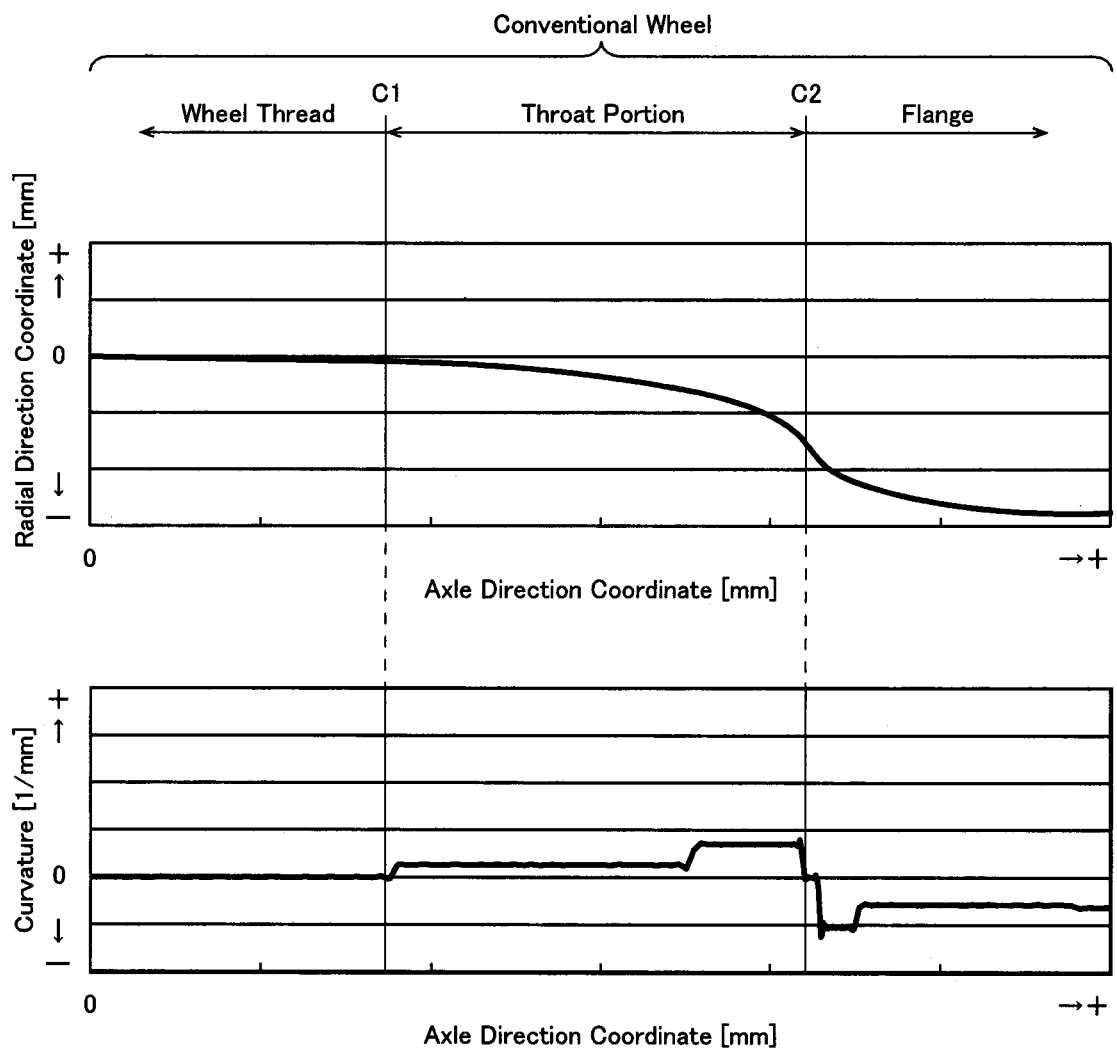
FIG. 4 shows graphs representing, with respect to a longitudinal section of a conventional wheel, a contour of the wheel and the curvature thereof, respectively.

In contrast, in a conventional wheel, the protrusion 131 is not provided in a throat portion. FIG. 4 shows graphs representing, by the same method as in FIG. 3, the contour (external shape) of a conventional wheel and the curvature thereof. As illustrated in FIG. 4, in the conventional wheel also, in the outer peripheral surface thereof, a portion between the contour coordinates C1 and C2 at which the curvature begins to change from substantially zero to the positive side is a throat portion. However, the conventional throat portion has a positive curvature in its entirety. In other words, because the protrusion 131 is not formed in the conventional throat portion, the conventional throat portion does not have a portion at which the curvature is a negative value.

Returning to FIG. 2, preferably the protrusion 131 is connected by a curved face with the other portions 132. In other words, preferably the protrusion 131 is smoothly connected with the other portions 132. However, the shape of the protrusion 131 and connecting portions between the protrusion 131 and the other portions 132 is not particularly limited.

In the present embodiment, in the throat portion 13, the protrusion 131 is disposed in a region that is closer to the flange 12 than to the wheel tread 11. The protrusion 131 is provided on the flange 12 side relative to a center line Y of the throat portion 13 in the axial direction. The protrusion 131 may be provided on the center line Y of the throat portion 13, or may be provided on the wheel tread 11 side relative to the center line Y.

The size of the protrusion 131 can be determined as appropriate. Although described in detail later, the protrusion 131 is a portion that contacts the rail 200 simultaneously with the flange 12 or the other portions 132 of the throat portion 13. For example, a contact geometry analysis can be performed and the size of the protrusion 131 can be determined so that contact between the flange 12 or the other portions 132 of the throat portion 13 and the rail 200 is not inhibited by the protrusion 131.

[Contact Between Wheel and Rail]

Figure 5:
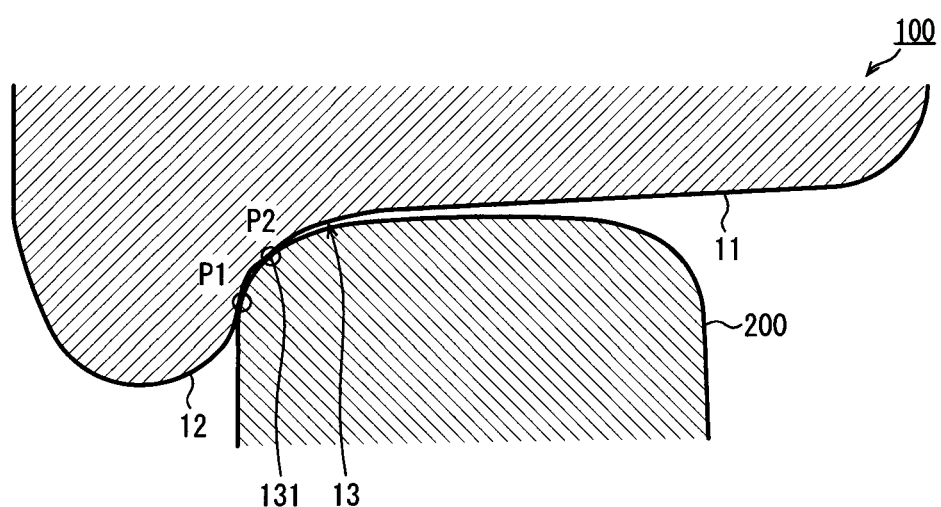
FIG. 5 is a view illustrating a contact state between the wheel and the rail illustrated in FIG. 1.

Next, contact between the wheel 100 and the rail 200 when the railway vehicle travels around a curve will be described referring to FIG. 5. In the present embodiment, a case will be described in which the rail 200 is an outer rail. FIG. 5 is a view illustrating a contact state between the wheel 100 and the rail 200 when the railway vehicle travels around a curve.

As illustrated in FIG. 5, in a case where the railway vehicle travels around a curve, in the wheel 100 on the outer rail side, the flange 12 contacts the rail 200. In the example illustrated in FIG. 5, the wheel 100 contacts the rail 200 at a point P1 of the flange 12.

The wheel 100 also comes in contact with the rail 200 at the protrusion 131, and not just the flange 12. When the point P1 of the flange 12 is contacting the rail 200, a point P2 of the protrusion 131 contacts the rail 200. The wheel 100 has the point P1 of the flange 12 and the point P2 of the protrusion 131 as contact points with the rail 200. In other words, when the railway vehicle is travelling around a curve, the wheel 100 contacts the rail 200 at two points.

Advantageous Effects of Embodiment

In the wheel 100 according to the present embodiment, the protrusion 131 is provided along the entire circumference of the throat portion 13. When the railway vehicle travels around a curve, the wheel 100 contacts the rail 200 at two points, namely, the contact point P2 of the protrusion 131 and the contact point P1 of the flange 12. Accordingly, the lateral force can be dispersed between the protrusion 131 and the flange 12. By dispersing the lateral force in this way, it is possible to reduce the contact interfacial pressure and the longitudinal creep force and to reduce wear of the wheel 100, more specifically, to reduce wear of the flange 12.

In the present embodiment, preferably, the protrusion 131 is connected by a curved face with the other portions 132 of the throat portion 13. By this means the wheel 100 can be caused to smoothly move on the rail 200. Thus, in a railway vehicle on which the wheel 100 is mounted, comfortable ride quality can be secured.

An embodiment according to the present disclosure has been described above. However the present disclosure is not limited to the above embodiment, and various changes are possible within a range that does not deviate from the gist of the present disclosure.

EXAMPLE

Hereunder, the present disclosure is described in further detail by way of an Example. However, the present disclosure is not limited to the following Example.

Commercially available mechanism analysis software ("Simpack" made by Dassault Systemes) was used to perform a kinematic analysis that simulated the passage around a curve of a carriage for a railway vehicle. In the kinematic analysis, a model was constructed that was composed of one carriage frame and two wheel sets. In this model, the shape of the wheel 100 shown in FIG. 1 and FIG. 2 was used as an Example, and as a Comparative Example, a wheel shape was used that was the same as the shape of the wheel 100 with the exception that the protrusion 131 was not provided in the throat portion 13. For the Example and the Comparative Example, respectively, a kinematic analysis was performed under the railway and travel conditions described hereunder, and the maximum contact interfacial pressure was evaluated.

Figure 6:
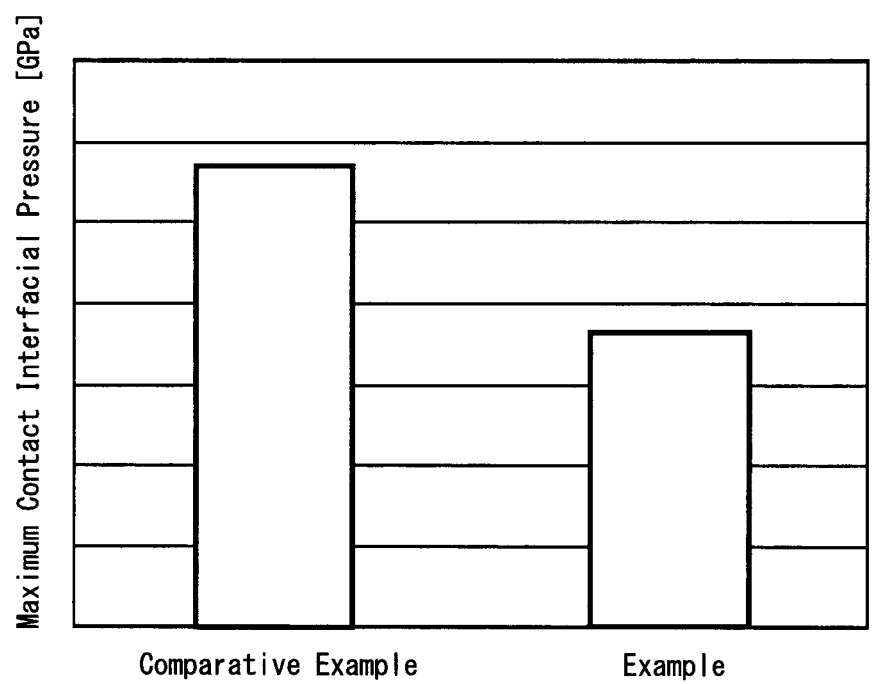
FIG. 6 is a graph showing the maximum contact interfacial pressure of a wheel in an Example and in a Comparative Example.

<Railway and Travel Conditions>
 Radius of curve: 200 m
 Curve section: 200 m
 Speed: 40 km/h FIG. 6 is a graph illustrating the maximum contact interfacial pressure of the wheels in the Example and Comparative Example. As illustrated in FIG. 6, the maximum contact interfacial pressure of the wheel according to the Example was less than the maximum contact interfacial pressure of the wheel according to the Comparative Example. Thus, it was shown that the maximum contact interfacial pressure was reduced by providing the protrusion 131 in the throat portion 13.

For each of the Example and the Comparative Example, a wear propagation simulation was performed by applying the wear law of Tγ to the results of the aforementioned kinematic analysis. According to the wear propagation simulation, the wear weights of the wheels when the models according to the Example and Comparative Example were repeatedly caused to travel under the above described railway and travel conditions were estimated.

Figure 7:
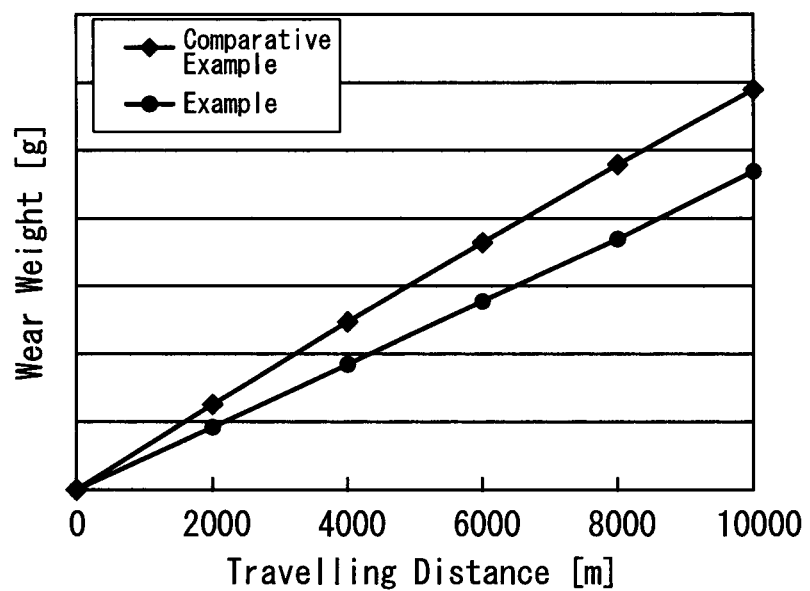
FIG. 7 is a graph showing wear weights of a wheel in the Example and in the Comparative Example.

FIG. 7 is a graph illustrating the wear weight of a wheel on the outer rail side of a first axle with respect to the Example and the Comparative Example, respectively. As illustrated in FIG. 7, the wear weight of the wheel according to the Example decreased relative to the wear weight of the wheel according to the Comparative Example. Thus, it was shown that the wear resistance of the wheel improved by providing the protrusion 131 in the throat portion 13.

Thus, it was confirmed that according to the structure of the wheel of the present disclosure, the contact interfacial pressure (lateral force) between the wheel and the rail can be reduced, and the wear resistance of the wheel can be improved.

REFERENCE SIGNS LIST

100: Wheel
11: Wheel tread
12: Flange
13: Throat portion
131: Protrusion

What is claimed is:

1. A wheel for a railway vehicle that travels on a rail with a curve, comprising:
 a wheel tread provided on an outer circumferential portion of the wheel, the wheel tread facing a head surface of the rail;
 a flange provided on the outer circumferential portion of the wheel, the flange projecting further outward than the wheel tread in a radial direction of the wheel; and
 a throat portion that connects a surface of the flange and the wheel tread, the throat portion having a protrusion that projects to the rail side and extends along an entire circumference of the throat portion, the protrusion curving in the opposite direction to other portions of the throat portion which are adjacent to the protrusion, the protrusion being monolithic with the wheel,
 wherein the wheel and the rail are configured such that when the railway vehicle travels around the curve and the rail is an outer rail in the curve, the wheel comes in contact with a side part of a rail head of the rail both at the protrusion and at the flange of the wheel.

2. The wheel according to claim 1, wherein:
the protrusion is connected by a curved face with a portion of the throat portion other than the protrusion.

* * * * *